May 12, 1970　　　　　E. VALLAK ET AL　　　　3,511,643
METHOD FOR COOLING OF COMBUSTION OR HIGH
TEMPERATURE REACTION CHAMBERS
Filed May 4, 1965　　　　　　　　　　　　　3 Sheets-Sheet 3

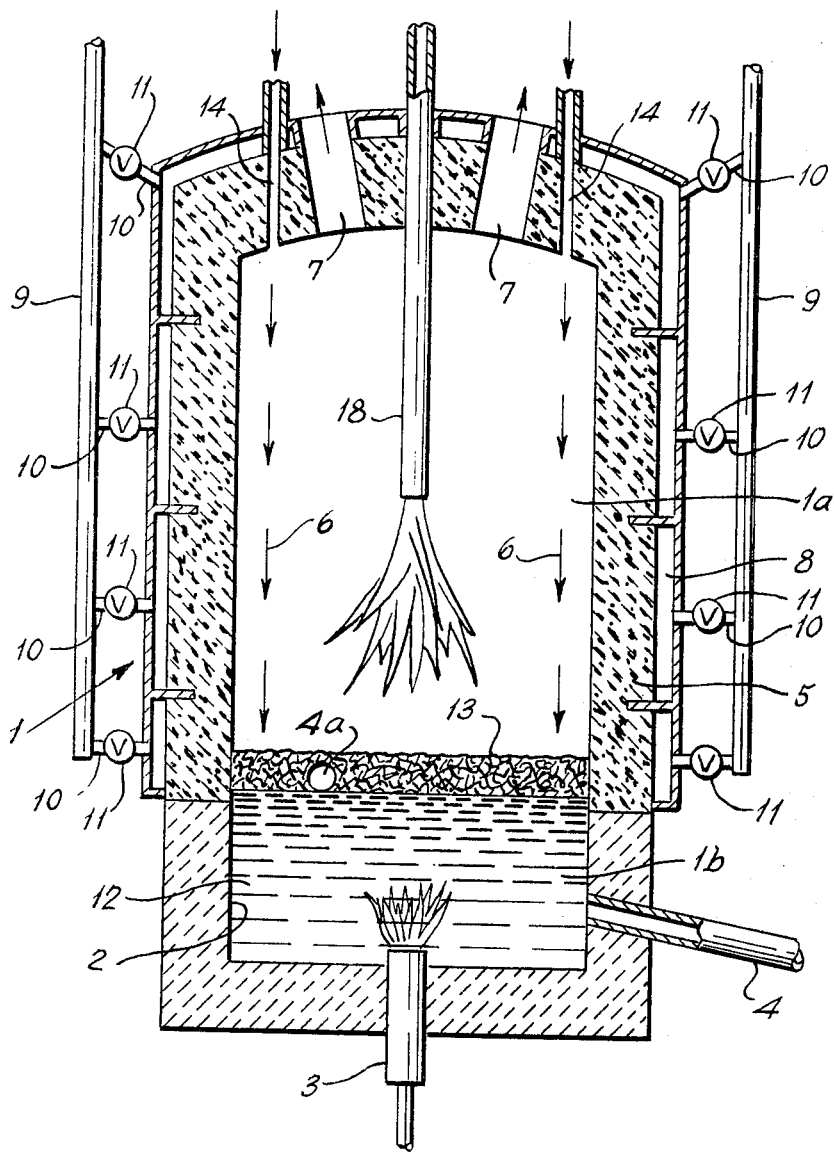

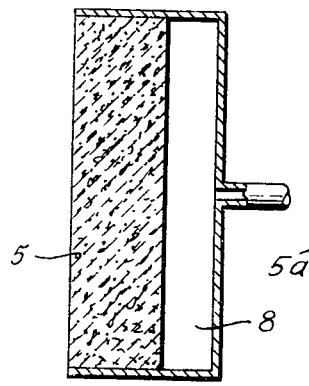
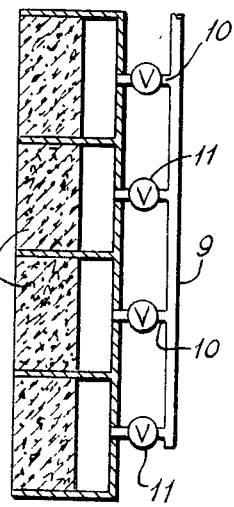
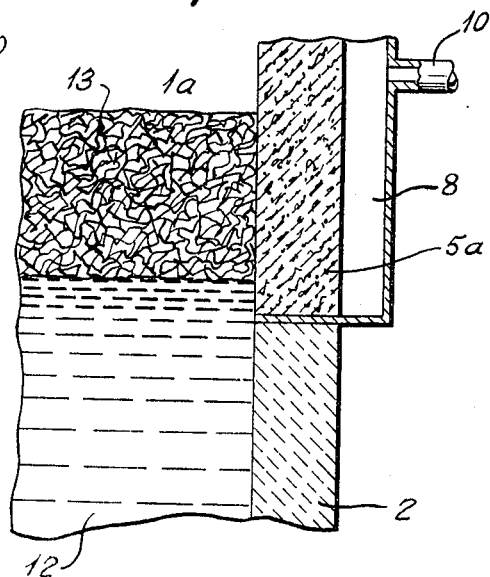
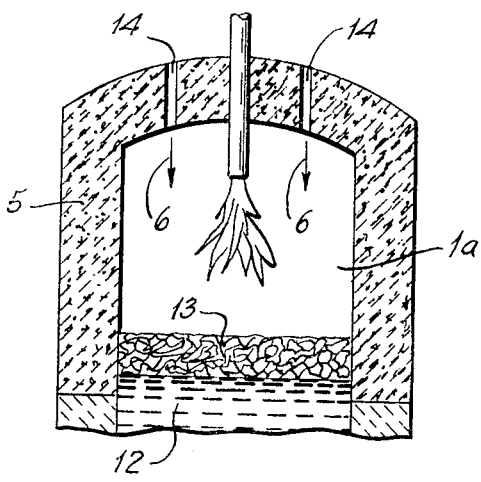
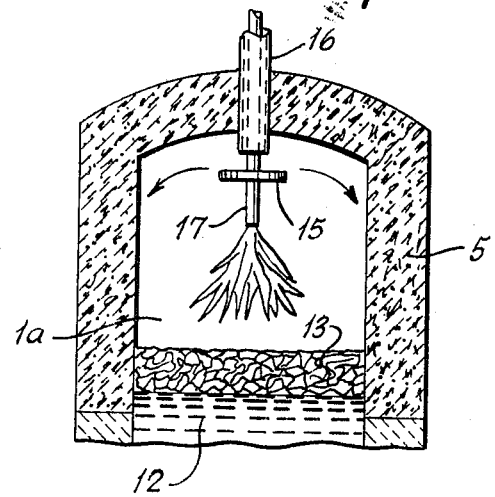
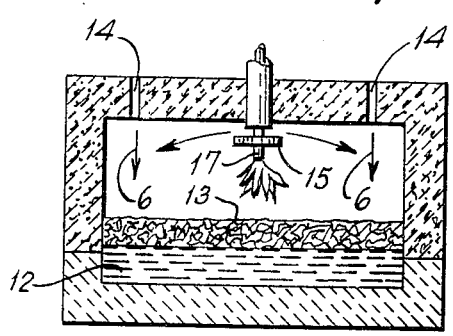

ENN VALLAK
and　　　INVENTORS.
SVEN GUSTAF HARALD EKETORP
BY
Albert M. Parker
ATTORNEY.

United States Patent Office 3,511,643
Patented May 12, 1970

3,511,643
METHOD FOR COOLING OF COMBUSTION OR HIGH TEMPERATURE REACTION CHAMBERS
Enn Vallak, 82 Route de Florissant, Geneva, Switzerland, and Sven Gustaf Harald Eketorp, Bromma, Sweden; said Eketorp assignor to said Vallak
Filed May 4, 1965, Ser. No. 452,977
Claims priority, application Sweden, May 6, 1964, 5,642/64
Int. Cl. C22b 5/00; C21b 7/10; F23m 5/08
U.S. Cl. 75—40                                                         3 Claims

ABSTRACT OF THE DISCLOSURE

The heat encountered in the smelting reduction of metal oxides is prevented from damaging the liner of the smelting chamber and the process of smelting is enhanced in various related manners. A curtain of solid or liquid material which may be the raw material, such as metal oxide to be smelted, is introduced, advantageously by centrifugal action between the heat temperature zone of the chamber and the liner thereof. Also gas containing oxygen can be introduced through pores in the liner. Introducing the oxygen in this way for cooling the wall warms the oxygen for use in the process. This gas introduction can also prevent penetration of the slag into the chamber wall. Combinations of the curtain of solid or liquid material with the introduction of gas through the pores can also be employed.

---

During the last ten years interest in smelting reduction has greatly increased. Smelting reduction can be characterized as a reduction wherein the temperature is so high that either the reducing medium (e.g. carbon) or the oxide (e.g. iron ore) or both of these materials is in a molten state. Saying that the reducing medium (carbon) is in a molten state means that it is dissolved in the metal bath.

The process of smelting reduction can be divided into three constituent processes: (1) the carburization of the metal bath, (2) the decarburization of the bath, and (3) the heat transfer to the bath. Reduction conditions prevail in the bath while oxidation conditions exist above the bath. The carbon monoxide arising from the reduction is burned with oxygen above the bath and the heat thus generated is returned to the bath to supply the heat demanded by the reduction and carburization reactions. The three reactions—carburization, decarburization and heat transfer—are each matched by a raw material for the process; namely carbon in the form of coke, coal, gas or oil; oxygen in the form of metal oxide; and oxygen in the form of gas for burning the carbon monoxide to carbon dioxide. In the following description smelting reduction is applied to the reduction of iron oxide but other metals beside iron can be treated.

In a known variation of the smelting reduction process carbon material is supplied in excess amounts and the reduction occurs in a coke powder layer which floats on the slag and iron bath. The process is carried out in a rotary kiln which gives rise to a certain amount of mixing and serves to transfer heat directly to the bath from the kiln lining heated by radiation.

It is provided in the present invention that the whole reaction, including the carburization as well as the decarburization, occurs in the bath. The carbon can be injected into the bath which means that oil or gas could be directly used. The iron oxide which serves as the decarburizing means—and naturally also as the supply of iron—should be as finely granulated as possible and this condition is best fulfilled by a rich iron ore concentrate. The grain size of the ore concentrate should also be small so that the reaction with the bath would be as fast as possible and—as later described—have a large surface for rapid absorption of heat.

Heat transfer to the bath occurs through radiation from the burning of the carbon monoxide with oxygen. This radiation heat can be transferred directly to the bath and, according to the invention, transferred to the ore to heat it to a high temperature. The ore absorbs this radiation heat during its movement toward the iron bath and in this way the radiation heat is transferred indirectly to the bath. The quantity of heat which is transferred to the bath is 1–1.5 millions Kcal./ton of raw iron. A significant portion of this heat can be transferred via the ore concentrate if it can be heated to a high temperature by radiation from the high temperature zone. The ore concentrate can be heated up to its melting point. This is possible only if the ore concentrate is heated in the same reactor or oven in which the reduction is carried out and if the ore reaches the bath directly without coming into contact with the lining of the oven. Molten iron oxide is extremely corrosive on the material in the oven's lining. If the ore concentrate is preheated to 1000° C. it can absorb about 0.3 million Kcal. calculated with a rich ore concentrate with a consumption of 1.5 tons of concentrate for one ton of raw iron. When heated to 1500° C.—thus above the melting point of the oxide—the absorbed heat amounts to about 0.5 million Kcal. In these cases the heat which the ore concentrate carries to the bath amounts to 25% to 40% of the total heat to be transferred to the bath.

The speed of heat transfer by radiation is proportioned to the fourth power of the difference between the temperatures in the combustion zone and the bath. Because of this it is desirable to maintain the bath's temperature as low as possible (a condition which is promoted by a high carbon content in the bath) and at the same time the temperature in the combustion zone should be as high as possible. For this last objective it is desirable to use pure oxygen for combustion. With oxygen the temperature can be about 2500° C., particularly when the oxygen is preheated according to the present invention.

With high combustion temperatures the oven lining is subjected to great stresses and in practice there is no material which can withstand such operating temperatures. Cooling of the lining can of course be arranged in different ways on the oven's outside or within the refractory lining, but then large cooling losses can not be avoided since a flow of heat is maintained from within and out through the oven's or chamber's lining. Instead the present invention preferably combines the cooling with the preheating of at least one of the raw materials for the process. For this purpose the present invention is characterized in that powdered, particulate or liquid material in the form of at least one cooling curtain or layer substantially surrounding a high-temperature zone of said combustion or reaction chamber is supplied as cooling agent between the lining of said chamber and said high-temperature zone. The cooling material may consist of finely divided ore concentrate which is supplied in the form of a stream between the combustion zone and the lining. The powder material thus absorbs a large part of the radiant heat as described above and delivers this heat directly to the bath. The cooling material may also consist of some inert material such as sand. It may also consist of molten pig iron in the case of a process for making steel from pig iron by blowing oxygen therethrough. Also other liquid may be used.

The cooling effect may be further improved by supplying a gas such as oxygen or oxygen containing gas for burning in the combustion chamber through a porous fireproof lining of the combustion chamber. The oxygen or gas supplied in this manner prevents the flow of heat through the porous lining. The oxygen is forced through the lining from the outside to the inside and thereby cools the lining while the oxygen itself is being warmed.

The invention embraces various combinations of direct cooling through the passage of the gas and indirect cooling due to the curtain effect of the oxide material.

Some embodiments for carrying out the invention are shown schematically in vertical cross section in the accompanying FIGS. 1 through 10.

FIG. 1 is a vertical section of one embodiment of the invention.

FIG. 2 is a cross section of a cooling box at the outside of the wall of the oven or chamber.

FIG. 3 shows a distribution system for the cooling gas.

FIG. 4 shows a vertical section of the lower part of the over or chamber.

FIG. 5 shows, on a smaller scale, an oven according to a further embodiment.

FIG. 6 illustrates a still further embodiment of the means for supplying the cooling curtain.

FIG. 7 shows in vertical section an embodiment in the form of a combination of FIGS. 5 and 6.

Figure 8:
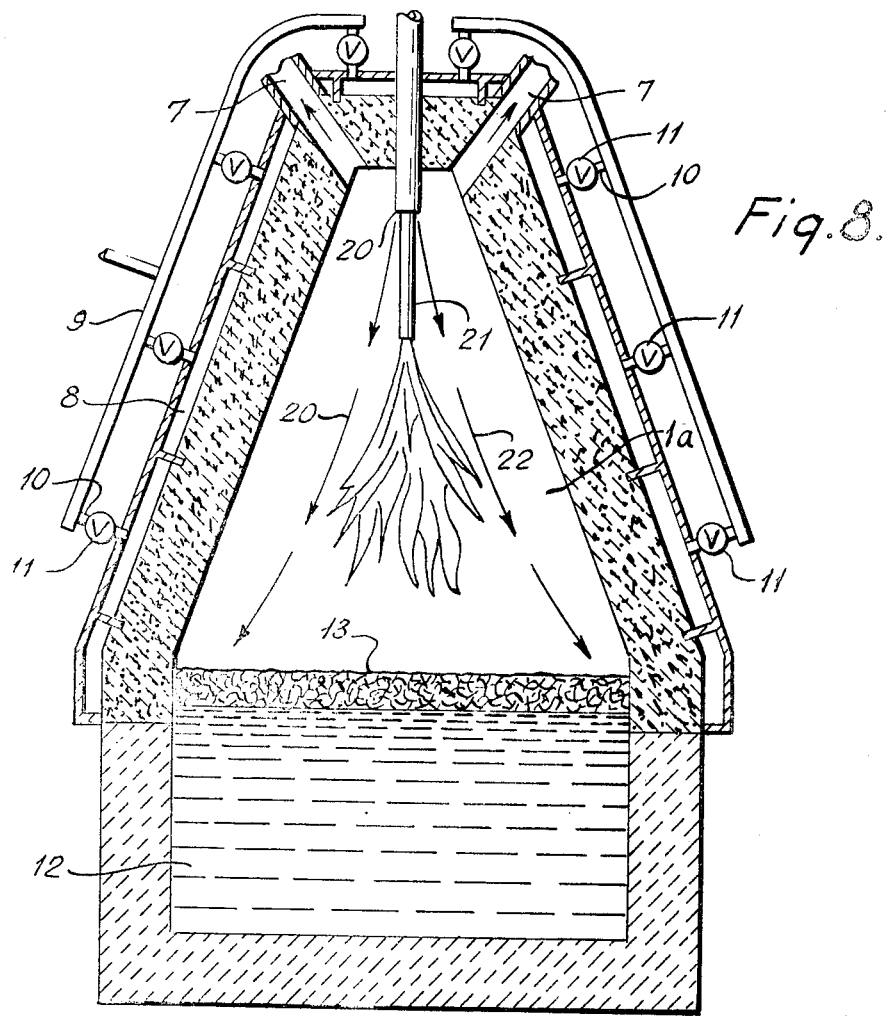
FIG. 8 shows a further embodiment of the top of the oven.

As an example the invention can be applied to a smelting reduction process which essentially functions as described below. The described principles are carried out in a specific way here but of course other practical ways are contemplated. According to FIG. 1 the kiln or reactor 1 consists of an upper part 1a and a lower part 1b. Liquid raw iron 12 and slag 13 are located in the lower part 1b. The kiln lining 2 here is made of the usual materials, preferably leakproof brick. The depth of the iron bath should be at least 0.5 meter and is normally 1 to 2 meters. This depth is necessary in order to achieve complete carburization when using oil or gas as the carburizing medium, but it is also—although to a lesser degree—important when using other carburizing mediums such as coke or powdered coal. The carburizing medium may be supplied through a jacketed, water cooled tube 3 at the bottom of the oven. The supply can just as well come from the side of the oven or from above if the mouth of the supply tube discharges within the raw iron bath. The drawing off of the raw iron can occur continuously through an outlet 4 and the level of the outlet lies relatively far under the surface of the raw iron bath. The slag which is likewise drawn off continuously is tapped at a higher level through a slag outlet 4a.

The burning of the carbon monoxide from the bath with oxygen and also the supply of the ore concentrate occurs in the oven's upper part 1a. In this part the oven's walls 5 are porous and are cooled by the oxygen as will be described in detail below. The ore concentrate is supplied from above in form of one or more curtains 6 which will also be described in the following. Besides the oxygen which is supplied through the porous lining material 5, oxygen is also supplied directly to the upper part or combustion space 1a. Exhaust gas, which mainly consists of carbon dioxide, leaves the upper part of the oven through gas outlet 7.

The invention's main characteristic—that is the cooling of the lining material and its protection against radiation—will now be described more in detail.

The porous lining wall 5 can be made of various ceramic materials but as a general rule the higher the melting and softening temperatures of the material, the smaller the amount of cooling gas needed to achieve the desired safe temperature at the lining's inner surface. If porous fireclay is used for example the temperature of the inner surface must be less than 1400° C., while porous silica can endure up to 1650° C. and porous magnesite material up to 2000° C. When the raw iron bath has a temperature of about 1400° C., it is realized that the radiant heat from a cooled fireclay wall is insignificant while that from a cooled magnesite wall can be great. Owing to this the wall can take part in transferring heat to the bath.

The porous wall 5 is constructed so that the ceramic material is enclosed in a plate box 8 to make possible the forcing of oxygen through the wall (see FIG. 2). The thickness of the wall 5 can be very small since the lining material has the appreciably high temperature only in an inner layer some millimeters thick. Therefore the thickness of the wall is determined only by considerations of firmness. The porous wall can consist of large or small segments of units 5a (see FIG. 3). The oxygen supplied to each unit 5a can be separately regulated if they require different amounts of cooling gas. The oxygen is supplied through tube 9 furnished with branches 10 and valves 11 for regulating the oxygen input into the various parts of box 8. In passing through the porous brick 5a, the oxygen is heated to a temperature approximately equal to the temperature of the face of the lining 5 facing the combustion space 1a, that is 1400°–2000° C. In this way the simultaneous cooling of the wall 5 and high temperature in the combustion space 1a is made possible.

Besides the purely cooling effect of the gas passing through the brick 5 it also has another very important function. That is, it maintains a continuous gas stream from the lining's inner surface toward combustion space 1a. Thereby the direct contact with and penetration into the wall by the slag is avoided. Other than the high temperature the slag action is the most important cause of wear and tear on the fireproof material. In a combination of cooling by gas passage and cooling through the reduction of radiation by the ore concentrate curtain described below, this avoidance of direct wall contact is particularly important. The ore concentrate, i.e. pure iron oxide, especially in molten form is extremely corrosive on all ceramic material, and cooling by means of an ore concentrate curtain presupposes the passage of gas through the lining material in order to prevent the dressed ore from coming in contact with the wall.

FIG. 4 shows how the porous lining 5a is arranged at the levels where the floating slag 13 and raw iron 12 are located. This porous wall 5 is shown here to extend along the entire depth of the slag 13 so that the gas stream through wall 5a will prevent the slag from coming in contact with the lining 5a. However the slag is often not so aggressive when it has a relatively low iron content.

The cooling by using the other raw material in smelting reduction, that is the ore concentrate, shall, according to the invention, occur in a way that the dressed ore serves as one or more heat absorbing curtains between the really hot temperature zone in the combustion space 1a and the porous lining materials 5, 5a. In this way only a part of the radiant heat reaches the wall and a smaller amount of oxygen need be forced through the lining. In fact the amount of gas supplied through the lining is reduced so much that a part of the amount needed for the process, e.g. 300–350 normal cubic meters of $O_2$/ton of raw iron, can be supplied directly to the combustion space 1a through pipe 18 for burning of the carbon monoxide.

FIGS. 5–8 show various embodiments for forming the ore concentrate curtains. Only details necessary for the adding of the ore concentrate and the lining are shown in these figures. FIG. 5 shows the embodiment as in FIG. 1. The dressed ore is supplied here in a ring shaped column 14 and the stream of ore concentrate forms a circular curtain 6 inside the combustion space 1a. In FIG. 5 the combustion space is so high that an extra curtain under the ceiling of the space is not needed. FIG. 6 shows an arrangement where the ore concentrate is supplied through a hollow shaft 16 and thrown out toward the oven's sides by means of a rapidly rotating disk 15 which may be hollow and water cooled. The ore concentrate then falls down toward the bath. The oxygen for burning is supplied through an inner hollow shaft 17 through the rotating disk 15 and the dressed ore is fed in around this shaft 17 and reaches the rotating disk.

The rate of heat transfer to the raw iron bath is proportional to the size of the surface of the bath and therefore one should strive to obtain as large a surface as possible expressed in m$^2$./ton/hr. For this purpose the oven and combustion space is suitably arranged as shown in FIG. 7. This embodiment is a combination of the embodiments of FIGS. 5 and 6. In this embodiment the dressed ore receives a very strong horizontal motion toward the chamber's sides by means of the rotating disk 15. Nearer the sides is found an additional inlet for the supply of dressed ore. This additional inlet is a ring shaped cavity as in FIG. 5 and this additional amount of dressed ore prevents the centrally supplied ore from touching the sides of the oven.

Figure 9:
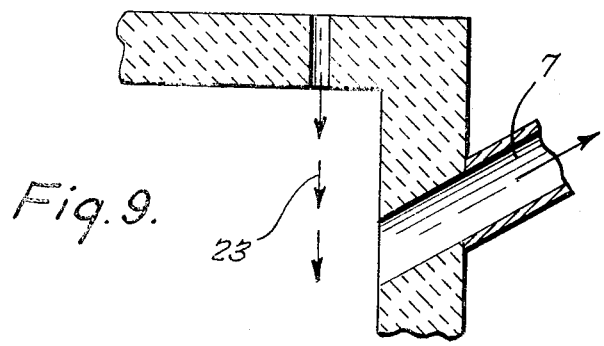
FIG. 9 is a detail view of a further embodiment.

In the embodiment of FIG. 8 the ore concentrate is supplied through a tube 20 which is arranged so that the stream of ore is shaped like a cone 22. The combustion space 1a likewise in this case has a conical shape in whose center the oxygen is supplied through a pipe 21 and the burning of CO occurs. The stream of ore concentrate moves the great speed parallel with the oven wall. Exhaust gases leave the oven at outlet 7 in its upper part, and the gases as shown in FIG. 8 must pass through the cooling stream of ore. At outlet 7 a rapid ore stream can be arranged according to FIG. 9 in order to prevent small ore particles with low speeds from accompanying the exhaust gas out of the oven.

In all cases where the ore concentrate is supplied it may be supplied in the following ways:

(1) It merely runs down through a supply tube,
(2) It is supplied together with the oxygen, or
(3) It is mechanically supplied at a great velocity.

In alternatives (2) and (3) the ore concentrate has greater kinetic energy and it is therefore easier to direct the ore stream (or streams) in the desired way and cause the ore to penetrate down into the slag and raw iron bath.

It should be noted that the invention embraces cooling by means of oxygen supplied through the porous wall as well as cooling by means of the ore and also combinations of the two measures. Instead of building the walls of inherently porous or gas permeable materials, the walls can in a suitable manner be furnished with through passages such as fine canals or pores. The wall 5 can terminate directly over or under the slag bath 13.

What we claim is:

1. The method of cooling a combustion or reaction chamber, in smelting reduction of metal oxides and the like, comprising introducing flowable material into a central upper portion of the chamber, imparting a high speed outward motion to the material under the action of centrifugal force for evenly distributing the material toward sides of the chamber, and allowing the distributed material to fall downwardly near the chamber walls without contacting said walls for forming a uniform substantially annular cooling curtain of flowing material to surround a high temperature zone within said chamber.

2. The method according to claim 1 wherein the material of said curtain consists of particulate raw material for a smelting reduction process to be performed in said chamber.

3. The method according to claim 1 wherein the cooling effect is improved by supplying gas containing oxygen into the chamber through a porous refractory liner defining said chamber.

References Cited

UNITED STATES PATENTS

| | | | |
|---|---|---|---|
| 3,259,484 | 7/1966 | Leroy et al. | 75—60 X |
| 1,550,655 | 8/1925 | Ambler et al. | 75—92 |
| 1,746,904 | 2/1930 | Pike | 266—27 X |
| 2,194,454 | 3/1940 | Greenawalt | 266—27 X |
| 2,201,738 | 5/1940 | Neve | 266—27 |
| 2,339,192 | 1/1944 | Roberson | 266—32 X |
| 2,418,394 | 4/1947 | Brown | 75—26 |
| 2,503,555 | 4/1950 | Lykken | 75—38 X |
| 2,654,594 | 10/1953 | Somogyi | 266—27 X |
| 2,902,358 | 9/1959 | Kalling et al. | 75—60 |
| 2,991,173 | 7/1961 | Trentini et al. | 75—60 X |
| 3,190,470 | 6/1965 | Ritter | 266—27 X |
| 3,198,503 | 8/1965 | Eichelberg et al. | 266—32 X |

FOREIGN PATENTS 650,625   10/1962   Canada.

HENRY W. TARRING II, Primary Examiner

U.S. Cl. X.R.

75—92; 263—44; 266—27